United States Patent
Skvortsov

(10) Patent No.: US 11,422,782 B1
(45) Date of Patent: Aug. 23, 2022

(54) TRANSFORMING LOGIC PROGRAMMING LANGUAGE CODE INTO STRUCTURED QUERY LANGUAGE CODE

(71) Applicant: Google LLC, Mountain View, CA (US)

(72) Inventor: Evgeny Skvortsov, Kirkland, WA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 17/162,514

(22) Filed: Jan. 29, 2021

(51) Int. Cl.
G06F 9/45 (2006.01)
G06F 8/51 (2018.01)
G06F 8/41 (2018.01)

(52) U.S. Cl.
CPC .............. G06F 8/51 (2013.01); G06F 8/447 (2013.01)

(58) Field of Classification Search
CPC .................................. G06F 8/51; G06F 8/447
USPC .......................................................... 717/137
See application file for complete search history.

(56) References Cited

U.S. PATENT DOCUMENTS

| | | | | |
|---|---|---|---|---|
| 6,044,216 A * | 3/2000 | Bhargava | .................. | G06F 8/31 717/114 |
| 9,330,140 B1 * | 5/2016 | Bogrett | ............... | G06F 16/2456 |
| 2007/0239669 A1 * | 10/2007 | Ordonez | ............. | G06F 16/2453 |
| 2009/0030864 A1 * | 1/2009 | Pednault | ................. | G06N 5/003 706/45 |
| 2012/0191690 A1 * | 7/2012 | George | ............. | G06F 16/24547 707/E17.108 |
| 2017/0235735 A1 * | 8/2017 | Ignatyev | ................ | G06Q 10/00 706/12 |
| 2018/0095962 A1 * | 4/2018 | Anderson | ........... | G06F 16/2365 |
| 2018/0165330 A1 * | 6/2018 | Halbani | ............ | G06F 16/24522 |
| 2018/0349377 A1 * | 12/2018 | Verma | ..................... | G06N 5/022 |
| 2019/0188037 A1 * | 6/2019 | Tekelioglu | ............ | G06F 9/5072 |
| 2022/0035611 A1 * | 2/2022 | Cseri | ................. | G06F 16/24554 |

OTHER PUBLICATIONS

Title: A comprehensive XQuery to SQL translation using dynamic interval encoding; author: D DeHaan, published on 2003.*
Title: Semantic mapping between natural language questions and SQL queries via syntactic pairing author: A Giordani, published on 2009.*
Abadi et al., "TensorFlow: large-scale machine learning on heterogeneous distributed systems," Google Research, Mar. 2016, 19 pages.

(Continued)

*Primary Examiner* — Chameli Das
(74) *Attorney, Agent, or Firm* — Fish & Richardson P.C.

(57) ABSTRACT

A method for efficiently translating logic programming language code into structured query language (SQL) code that includes receiving input written in a logic programming language (LPL) that indicates a function that is defined in the LPL, but is not defined in a target SQL used to access a dataset, translating the input written in the LPL into the target SQL to generate translated SQL code, including transforming the function not defined in the target SQL into code for a series of functions that (i) are defined in the target SQL and (ii) together achieve a result of the function not defined in the target SQL, and executing the translated SQL code to achieve a result of the function that is not defined in the SQL, including executing the code for the series of functions that together achieve the results of the function that is not defined in the target SQL.

17 Claims, 4 Drawing Sheets

(56) References Cited

OTHER PUBLICATIONS

Cali et al., "A general datalog-based framework for tractable query answering over ontologies," Proceedings of the ACM SIGMOD-SIGACT-SIGART Symposium on Principles of Database Systems, Jun. 2009, pp. 77-86.
Ceri et al., "What you always wanted to know about datalog (and never dared to ask)," IEEE Transactions on Knowledge and Data Engineering, Mar. 1989, 1:146-166.
Chamberlin et al., "SEQUEL: A structured English query language," Proceedings of the 1974 ACM SIGFIDET (Now SIGMOD) Workshop on Data Description, Access and Control, May 1974, pp. 249-264.
Chamberlin, "Early history of SQL," IEEE Annals of the History of Computing, Nov. 2012, 34:78-82.
Chin et al., "Yedalog: exploring knowledge at scale," 1st Summit on Advances in Programming Languages, Apr. 2015, pp. 63-78.
Codd, "A database sublanguage founded on the relational calculus," Proceedings of the 1971 ACM SIGFIDET (Now SIGMOD) Workshop on Data Description, Nov. 1971, pp. 35-68.
Codd, "A relational model of data for large shared data banks," Commun. ACM, Jun. 1970, 13:377-387.
Consens et al., "Low complexity aggregation in graphlog and datalog," Proceedings of the International Conference on Database Theory, Dec. 1990, pp. 379-394.
Duta et al., "Functional-style SQL UDFs with a capital 'F'," Proceedings of the 2020 ACM SIGMOD International Conference on Management of Data, Jun. 2020, 15 pages.
Green, "A declarative language for enterprise applications," Proceedings of the 34TH ACM SIGMODSIGACT-SIGAI Symposium on Principles of Database Systems, May 2015, 59-64.
Greer, "Daytona and the fourth-generation language cymbal," Proceedings of the 1999 ACM SIGMOD International Conference on Management of Data, Jun. 1999, 10 pages.
Hella et al., "Logics with aggregate operators," Journal of the ACM, Jul. 2001, 48(4):880-907.
Jamil, "GQL: A reasonable complex SQL for genomic databases," Proceedings of the IEEE International Symposium on Bio-Informatics and Biomedical Engineering, Nov. 2000, 11 pages.
Koehler et al., "Measuring cross-device online audiences," Google, Inc., May 2016, 33 pages.
Kowalski, "The early years of logic programming," Commun. ACM 31, Jan. 1988, 31:38-43.
Koymen et al., "SQL*: A recursive SQL," Inf. Syst., Mar. 1993, 18:121-128.
Melnik et al., "Dremel: A decade of interactive SQL analysis at web scale," Proc. VLDB Endow., Aug. 2020, 13:3461-3472.
Melnik et al., "Dremel: Interactive analysis of web-scale datasets," Proceedings of the VLDB Endowment, Sep. 2010, 3(1-2):330-9.
Noy et al., "Industry-scale knowledge graphs: lessons and challenges: five diverse technology companies show how it's done," Queue, May 2019, 28 pages.
Paszke et al., "Pytorch: An imperative style, high-performance deep learning library," Proceedings of the Conference on Neural Information Processing Systems, Dec. 2019, 12 pages.
Ramachandra et al., "Froid: optimization of imperative programs in a relational database," Proc. VLDB Endow., Dec. 2017, 17 pages.
Randles et al., "Using the jupyter notebook as a tool for open science: an empirical study," ACM/IEEE Joint Conference on Digital Libraries, Jun. 2017, 3 pages.
Seo et al., "Distributed socialite: a datalog-based language for large-scale graph analysis," Proc. VLDB Endow., Sep. 2013, 12 pages.
Shkapsky et al., "Big data analytics with datalog queries on spark," Proceedings of the International Conference on Management of Data, Jun. 2016, pp. 1135-1149.
Skvortsov et al., "Virtual people: actionable reach modeling," Google Inc., Jun. 2019, 20 pages.
Wielemaker et al., "SWI-prolog," Theory and Practice of Logic Programming, Jan. 2012, 31 pages.
wikipedia.com [online], "Datalog," Nov. 5, 2021, retrieved on Dec. 1, 2021, retrieved from URL <https://en.wikipedia.org/wiki/Datalog>, 12 pages.

\* cited by examiner

TRANSFORMING LOGIC PROGRAMMING LANGUAGE CODE INTO STRUCTURED QUERY LANGUAGE CODE

TECHNICAL FIELD

This specification is related to logic programming and structured query language code compilation and execution.

BACKGROUND

Structured query language (SQL) is used for querying and managing data held in a relational database management system, and particularly for structured data which incorporates relations between and among entities and variables. SQL allows for efficient manipulation of large sets of data and is based on natural language syntax, which can be convenient for users to learn. However, SQL includes a limited number of functions and operations that are natively defined, and otherwise simple functions that exist in other languages can be verbose and difficult to read when written in SQL.

SUMMARY

In general, one innovative aspect of the subject matter described in this specification can be embodiment in a method for efficiently translating logic programming language code into structured query language code that includes receiving, by one or more processors, input written in a logic programming language, the input indicating a function that is defined in the logic programming language, but is not defined in a target structured query language used to access a dataset, translating, by the one or more processors, the input written in the logic programming language into the target structured query language to generate translated structured query language code, including transforming the function not defined in the target structured query language into code for a series of functions that (i) are defined in the target structured query language and (ii) together achieve a result of the function that is not defined in the target structured query language, and executing, by the one or more processors, the translated structured query language code to achieve a result of the function that is not defined in the structured query language, including executing the code for the series of functions that together achieve the results of the function that is not defined in the target structured query language.

In some implementations, translating the input written in the logic programming language into the target structured query language includes detecting a functor within a function written in the logic programming language, wherein the functor comprises code that maps a first predicate written in the logic programming language to a second predicate written in the logic programming language that comprises one or more operations, and replacing, based on the functor code, the first predicate within the function with the one or more operations of the second predicate.

In some implementations, the method further includes detecting an annotation that comprises a reserved predicate that defines a relationship between a variable or function and a defined set of data existing within a target database specified within the input written in the logic programming language.

In some implementations, the function that is not supported by the structured query language includes one or more unsafe predicates that are able to compromise a robustness of a server in the structured query language by (1) attempting to access one or more sets having infinite cardinality or (2) performing an operation that does not converge to a minimal fix point.

In some implementations, translating the input written in the logic programming language into the target structured query language to generate translated structured query language code includes determining that a function exists in a list of functions, wherein each entry maps a particular function in the logic programming language to one or more corresponding functions defined in the target structured query language, compiling, based on an entry in the list of functions, the function in the logic programming language into a corresponding function defined in the target structured query language.

In some implementations, transforming the function not defined in the target structured query language into code for a series of functions includes, for each function of the series of functions, applying the distributive rule to the operations of the function to transform the function to a disjunctive normal form, replacing each disjunctive in the disjunctive normal form of the function with a conjunctive to generate a conjunctive form of the function, replacing each call to a predicate with the predicate itself, wherein the predicate represents one or more sets of infinite cardinality, replacing each variable that is not bound to input predicate fields with an expression that operates over fields of specific tables being queried by the function, replacing each negation of a proposition with an in-body aggregation expression.

In some implementations, replacing each call to a predicate with the predicate itself includes determining that the predicate comprises one or more aggregated values, and for each aggregate value of the one or more aggregated values, determining that the aggregated value is assigned to a variable in the body of the predicate.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

The described techniques and systems use a compiler that receives input code written in a logic programming language and translates the input into SQL code. The logic programming language and its functionality is described in detail below.

Logic programming is a declarative programming paradigm in which a program is written as a set of logical statements, and uses syntax based on formal logic. SQL uses syntax based on natural language, and can be more accessible for users without formal training in mathematics or computer programming. The convenience of SQL, however, is costly when the task at hand is of high complexity—SQL queries can become confusing and difficult to read and write even for simple logic programs. Logic programming is based on mathematical syntax, and mathematical syntax is more appropriate for expressing logic than natural language when the logic has high complexity.

SQL allows fast and efficient performance of operations and functions across large datasets. However, SQL is a rigid language that does not include many functions natively, and requires the combination of many different functions and commands to perform certain functions, making large programs difficult to read and write. Logic programming languages offer more computational power, native functionality, and better readability than SQL.

By providing users with a system in which they can write programs (including queries) in a logic programming language, which is simpler to read and write, and compiling and executing functions in SQL, which is easily executable and efficient when manipulating large sets of data, the described system provides the advantages of both logic programming and SQL while avoiding the disadvantages of each. For example, using the techniques discussed herein, a function that is not defined in SQL, but is defined in a logic programming language, can be directly specified when the program/query is created, rather than having to specify multiple SQL functions that would provide a same result as the logic programming language function. This logic programming language function is compiled into a combination of multiple SQL functions that are required to achieve the same result as the logic programming function so that execution of the program/query will be executed in SQL. This enables more efficient creation of code that will provide desired results of a program or query, while still enabling the program or query to be carried out using SQL, which is typically more efficient to execute, particularly when operating on or analyzing large datasets, because many large datasets (e.g., "data warehouses") are built in SQL by users in various industries. This also reduces the likelihood of errors occurring at runtime relative to requiring the entire program/query to initially created in SQL, which would require the direct coding of many more sub-functions that need to be called to achieve the results of the logic programming function.

The described system includes a logic programming language, a compiler that translates logic programming language code that indicates a function that is defined into SQL code and compiles the code into machine-readable code that can be executed by an engine that processes SQL code. Compiling code written in logic programming language code into SQL code also allows a system to run logic programs on an infrastructure built for SQL, improving compatibility of programs across various different systems. Major database systems use SQL as their query languages, and the described system allows integration with existing systems, such as mature data science tools and systems. For example, the system allows a user to extract data and analyze the extracted data using tools that are already integrated with systems that use SQL.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for writing code in a declarative logic programming language that compiles into SQL, allowing the code to be both readable and to be executed efficiently. The described system allows logic programs to be executed on query engines built for SQL.

The described system introduces a logic language compatible with the system, providing users with the ability to write code using formal logic that is more compact (e.g., has fewer lines of code) and easier to read in order to query and manipulate sets of data, and particularly large sets of structured data. This results in a more efficient and user friendly data access system.

Figure 1:
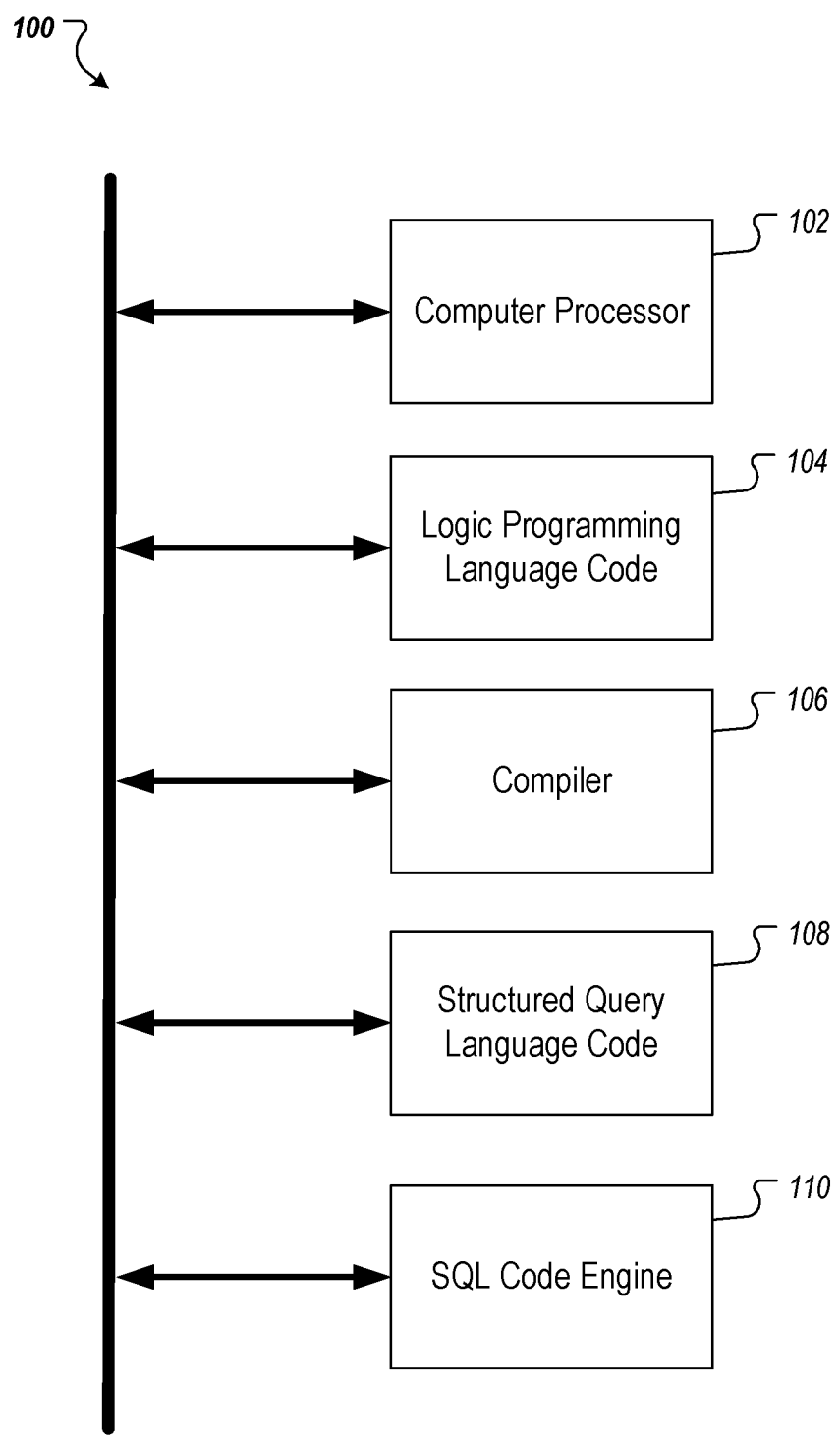
FIG. 1 is a block diagram of a system in which code written in a logic programming language can be translated to structured query language, compiled, and executed.

FIG. 1 is a block diagram of an environment 100 in which a compiler accepts logic programming language code as input and compiles the code, translating the logic programming language code into structured query language code. The example environment 100 includes a computer processor 102, logic programming language code 104, a compiler 106, structured query language code 108, and an engine to execute SQL code, or SQL code engine 110. The system 100 can be implemented as a distributed system across any number of files.

Computer processor 102 is a processor communicably coupled with the other components of system 100, and controls the operation of compiler 106 and engine 110. Processor 102 can receive source code and store the source code in memory 146 as translated source code. Logic programming language code 104 is code written in the logic programming language described below with respect to FIGS. 2-3.

Compiler 106 translates computer code written in one language into another language, a lower-level language, to create an executable program. More specifically, compiler 106 translates code written in the described logic programming code into computer-readable code compatible with an SQL engine to create an executable program. For example, compiler 106 can translate code written in the described logic programming code into SQL language and then into computer-readable code compatible with SQL code engine 110. In some implementations, compiler 106 can translate some or all of the code written in the described logic programming code directly into computer-readable code compatible with SQL code engine 110. In some situations, compiler 106 can be a source-to-source compiler.

Compiler 106 includes hardware and/or software necessary to perform the translation. For example, compiler 106 includes a translation module that represents any suitable components that facilitate the translation of a program from a first programming language to a second programming language. The translation module may include a network server, remote server, mainframe, host computer, workstation, web server, personal computer, file server, or any other suitable device operable to communicate with other devices and process data. In some implementations, the translation module may execute any suitable operating system. The functions of the translation module may be performed by any suitable combination of one or more servers or other components at one or more locations. In implementations where the modules are servers, the servers may be public or private servers, and each server may be a virtual or physical server. The server may include one or more servers at the same or at remote locations. The translation module may also include any suitable component that functions as a server.

Structured query language code 108 is code written in a structured query language designed for managing structured data. SQL is a set-based declarative programming language. Compiler 106 can translate logic programming language code 104 into structured query language code 108 and then generate computer-readable code, which is then output for execution by SQL code engine 110.

SQL code engine 110 executes the code output by compiler 120 and performs tasks according to the code. For example, SQL code engine 110 executes the code output by compiler 120 to perform manipulation and extraction of structured data.

Figure 2:
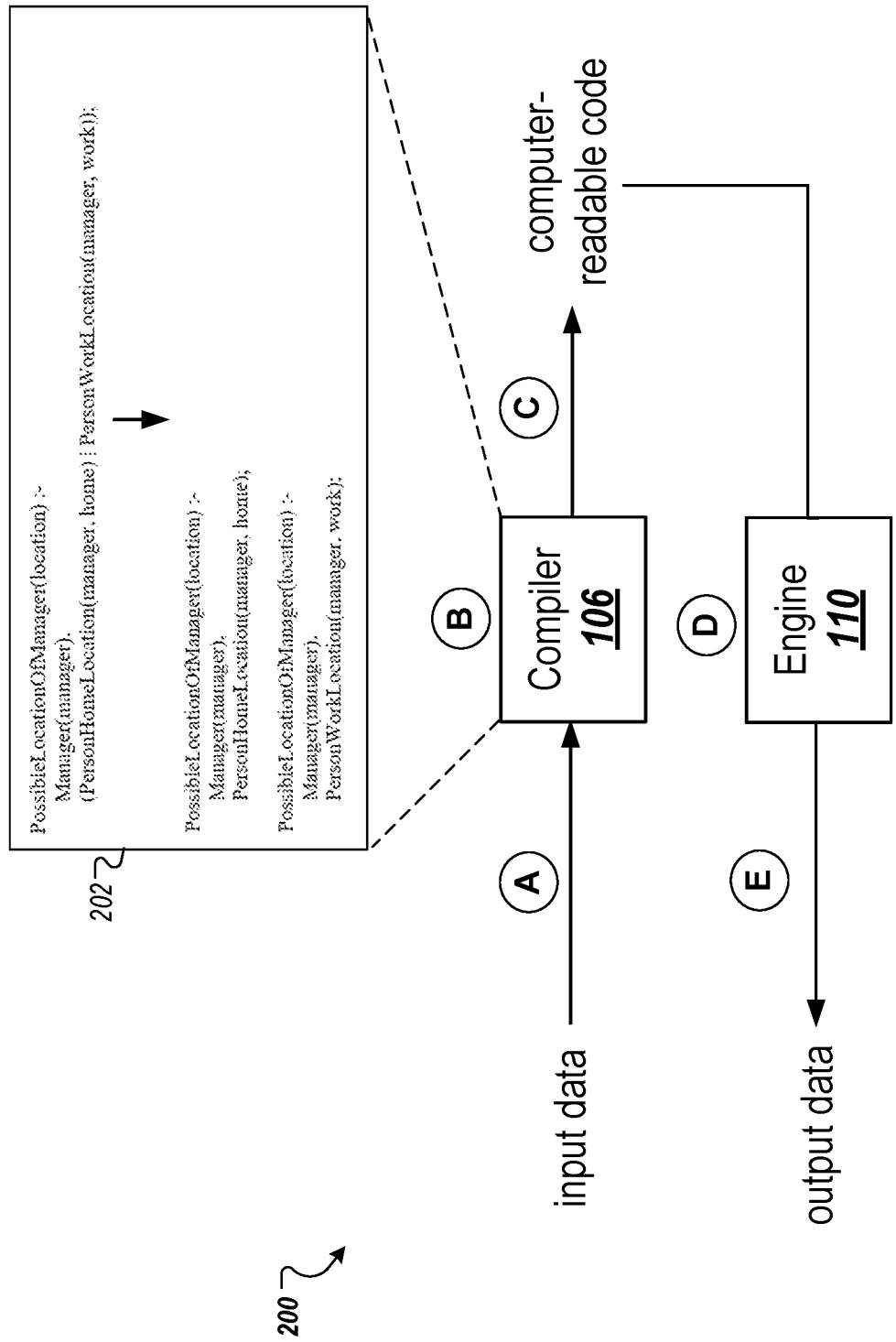
FIG. 2 is a data flow diagram of an example process for translating code written in a logic programming language to code written in structured query language, compiled, and executed.

FIG. 2 is a data flow diagram of an example process 200 for translating logic programming language code into structured query language code. Operations of the process 200 can be implemented, for example, by processor 102, logic programming language code 104, compiler 106, structured query language code 108, and SQL code engine 110. Operations of the process 200 can also be implemented as instructions stored on one or more computer readable media which may be non-transitory, and execution of the instructions by one or more data processing apparatus can cause the one or more data processing apparatus to perform the operations of the process 200.

The process 200 begins with stage A, in which logic programming language code is provided as input data to compiler 106. For example, a user can provide logic programming language code 104 as input to compiler 106.

The programming language includes a set of rules, each of which is either a fact statement or an implication. Rules are separated by a semicolon, as shown in Example 1.

Example 1

Human ("Socrates");
Mortal (x) :- Human (x);
Named and Positional Arguments

The logic programming language allows for named predicate arguments in contrast to mathematical logic syntax, in which predicate arguments form a tuple and the meaning of each argument is defined by its order. For example a predicate parent, defined as parent("Shmi Skywalker", "Anakin Skywalker"), has two arguments, "Shmi Skywalker" and "Anakin Skywalker," where the first argument refers to a subject and the second argument refers to the parent of the subject. However, while an ordered argument approach is convenient for predicates with one or two arguments, it does not scale well to predicates that represent tables with large numbers of columns, as is the case in SQL databases.

In one example, a table with customer contacts may include the contact's name, phone, email, website, social media pages, etc. If a user wanted to extract a single email from the table using an ordered argument approach, the user would need to remember which argument of the predicate corresponds to email and pass unused variables for other arguments. Instead, the described logic programming language allows users to refer to arguments by name. By allowing users to refer to arguments by name, the described logic programming language enhances readability not only for the user but for other users who are reading the code later. An example of using named arguments is given below:

Example 2

CustomerToContact(
   name: customer_name,
   email: customer_email) :-
   CustomerSpend(
   name: customer_name,
   spend: customer_spend),
   customer_spend>1000,
   Contact(name: customer_name,
   email: customer_email);
where the rule CustomerToContact extracts customers to contact, assuming that the user wishes to extract only those customers that spent more than 1000 USD within a predetermined period of time.

The described logic programming language may also support an ordered argument approach. While named arguments allows users working with structured data having a large number of columns simpler, it may make code more verbose. Therefore, the described logic programming language provides a user with the choice of whether to use positional arguments, allowing the definition of predicates using positional or named arguments. Additionally, if the variable that is being bounded to the argument shares the same name as the argument then the variable name can be omitted after the : symbol as shown, for example, in EXAMPLE 6, leading to a more efficient code structure.

Composite Data Types

The described logic programming language supports composite data types, such as records and lists, that are a combination of primitives and other data types. For example, a composite datatype allows various information about a user purchase to be stored in a single row of a table:

Example 3

Purchase(
   customer: "John Doe",
   items: [{name: "Toothpaste",
   price: 10},
   {name: "Soap",
   price: 3}]);
where Purchase represents a single row of the table. This single row has been formatted for readability. A field of a record can be addressed using the following syntax: <record>.<field>. An infix operator in can be used to iterate over all values in a list. For example, the operator in can be used to transform a customer-level predicate Purchase into an item-level predicate ItemPurchase:

Example 4

ItemPurchase(
   customer:, item_name:, price:) :-
   Purchase(customer:, items:),
   item in items,
   item_name==item.name,
   price==item.price;
Aggregation The described logic programming language supports aggregation. Aggregation operations, such as finding a sum or a maximum of a table column can be performed using aggregation syntax. For example, a reserved word distinct can be used to trigger predicate aggregation, because distinct predicates have no repeated rows. Columns to be aggregated are specified with the ? operator. In one example, the sum of all items that a customer has purchased is aggregated:

Example 5

CustomerSpend(
   customer:,
   spend? Sum=price) distinct :-
   ItemPurchase(customer:, price:);

Aggregation can be performed within the body of a rule, for example, to process lists. For example, list comprehension, or the creation of a new list based on the values of an existing list, can be implemented using aggregation syntax through a List aggregate function. One example of using aggregation in the body of the predicate is shown in Example 6, which shows an example program summarizing purchases by customer. In this example, the table Purchase has the same schema as the table from Example 3.

Example 6

PurchaseSummary (customer:,
  total_spend:,
  large_items:) :-
  Purchase(customer:, items:),
  total_spend Sum=(
  item.price :- item in items),
  large_items List=(
  item :-
  item in items, item.price>100);

Function Notation

The described logic programming language supports function notation. Functions play an important role in most programming languages, and a lack of functions in some programming languages forces the syntax of predicates to become overly complex—defining functions via a sequence of predicate calls can lead to code that is difficult for a user to parse. For example, SQL supports a limited number of functions, and defining functions in SQL can be complex and require many more predicate calls than defining functions in a logic programming language, such as the described logic programming language, thereby causing SQL to be a less efficient coding alternative.

Mathematically, a function $f: A \rightarrow B$ can be defined in terms of set theory as a subset of a Cartesian product $f \subseteq A \times B$ with the convention that $f(a)$ stands for $b \in B$ such that $(a, b) \in f$. Within the logic programming language, a predicate can be defined with a value and this value is treated as a column. When the predicate is then called within an expression, at compile time it is substituted with a variable. A call extracting this variable from the column of the predicate is added to the end of the body of the rule. For example, function notation is used for predicates that would be appropriate to define as user-defined functions in SQL. An example of function notation is shown in example 7, and example 8 illustrates that function notation is general and can also be used for predicates that represent tables. The logic programming language allows aggregation within the value field.

Example 7

BMI (height, weight)=
  weight/height ^ 2;
InToCm(inches)=inches*2.54;
LbToKg(pounds)=pounds/2.205;
PatientBMI(person_id:, bmi:) :-
  bmi==BMI(InToCm(height_inches),
  LbToKg(weight_pounds)),
  Patient(person_id:, height_inches:,
  weight_pounds:);

Example 8

NumVisits(person_id)+=1 :-
  PatientVisit(person_id:);
FrequentVisitorsInfo(
  person_id:, name:, phone:) :-
  PatientContact(
  person_id:, name:, phone:),
  NumVisits(person_id)>15;

Functors

The described logic programming language is generally a first order logic language, such that variables take values from the following set of data types: numbers, strings, and composite data types. In other words, the logic programming language does not allow assigning a predicate to a variable.

The logic programming language introduces functors, which allow for the efficient recycling of code and make it easier to apply previously defined functions in different contexts while improving the readability of the code. A functor, in the context of the logic programming language, is a function that maps a named tuple of predicates to another predicate. A symbolic definition □ of a predicate rule provided in the logic programming language can then be interpreted as a functor. Functors in the logic programming language operate on named tuples, which have argument names that coincide with predicates used in □. A functor maps a tuple, such as (p1:q1, . . . , pk:qk) to a predicate defined by □ where each $p_i$ is replaced with $q_i$. The logic programming language thus extends first order logic with functors, which are second order functions, providing additional functionality over SQL by leveraging previous predicate definitions and allowing users to query structured data while preserving the semantic clarity of the code used, thereby making the logic programming language more efficient for defining complex queries of structured data.

Predicates used within functors in the logic programming language compile to SQL statements with structure that can clearly be traced back to the predicate as defined by the user. This structure allows a user to control the order of the operations, whereas if predicates are allowed to be used as variables, preserving this structure would not be possible because SQL, the target language into which the logic programming language is translated, does not allow storing functions in tables. However, this functionality is generally provided by the logic programming language's use of functors, which can replace a predicate that calls for other predicates with those called predicates. This functor functionality is executed, for example, using the operator :=. The composition of functors can be implemented with one or more calls. More complex functors can be implemented by giving appropriate names to intermediate results. One example of a program implementing the LargePurchaseSummary predicate using a functor call is shown in Example 9:

Example 9

LargePurchase(customer:,
  total:, items:) :-
  Purchase(customer:, items:),
  total Sum=(item.price :-
  item in items),
  total>1000;
LargePurchaseSummary :=
  PurchaseSummary(
  Purchase: LargePurchase);

Annotations

The described logic programming language also introduces annotations that are used to express program semantics that do not fit into the framework of its first order logic or functors, thereby providing additional flexibility when constructing a program/query using the logic programming language. Predicates are intensional or extensional. Extensional predicates correspond to a table that exists within the database and intensional predicates are predicates defined in the program. In practice, the user may want to turn an intensional predicate into an extensional predicate by executing the rules and creating a physical table in the database with the result of the rule execution. The logic programming language uses annotations to perform functions including a command to turn an intensional predicate into an extensional predicate in order to provide functionality not available in existing SQL dialects in which a user can create a table or other structure that is not already in existence at the time of execution. For example, the logic programming language allows a user to create a table into which the results of a function can be stored without the table being pre-defined within the program.

Annotations within the logic programming function are formulated as facts using reserved predicates that are indicated, for example, with a symbol, such as @. For example, to associate a predicate with a database table, the reserved predicate @Ground can be used. Other annotations can include annotations used for sorting a table (e.g., @OrderBy), for limiting the number of rows in a table (e.g., @Limit), for defining command line flags of the program (@DefineFlag), among performing other functions. An example of the annotation @Ground being used is shown in Example 10:

Example 10

@Ground(CustomerSpend,
  "retail.customer_spend");
CustomerSpend(
  customer:,
  spend? Sum=price) distinct :-
  ItemPurchase(customer:, price:);
SaveCustomerSpend( )+=1 :-
  CustomerSpend( );
where CustomerSpend is a program for computing the total customer spend, and once execution of the predicate SaveCustomerSpend is requested, the results of the execution of predicate CustomerSpend will be saved to a physical table retail.customer_spend as indicated by the annotation @Ground.

In some implementations, only the predicates on which the predicate currently being executed depends will be saved. This allows a user of the system to define multiple pipelines in one file using the logic programming language.

The process 200 continues with stage B, in which compiler 102 translates logic programming language code into structured query language code and compiles the logical structured query language code into computer executable code. Compiler 102 includes additional syntax to simplify integration with databases, such as sorting output, or saving query results in the database.

Compilation

Compilation of the described logic programming language into SQL and then into computer-readable code is performed source-to-source from the logic programming language into SQL. Compilation of the logic programming language can be performed, for example, by compiler 106. In some implementations, the logic programming language can be compiled into one or more different SQL dialects.

Each SQL query statement must contain both a SELECT clause, used to select data from a database, and a FROM clause used to indicate a location from which the data is selected. In some implementations, compilation of the logic programming language to SQL involves translating arguments of the predicate in the head of the rule into values of a SQL SELECT clause and translating predicates in the body of the rule into tables in the FROM clause. Compilation of the logic programming language can involve translating predicates in the body of the rule into conjuncts in the WHERE clause, used within the SELECT statement to extract only those records that fulfill a specified condition.

The process with which compiler 106 performs compilation includes the following steps:
(1) Eliminate disjunctions, reduce all rules to the conjunctive form, allowing for more than one rule per predicate.
(2) Inject unsafe predicates.
(3) Resolve equalities, leaving only variables bound to input predicate fields.
(4) Replace negation with appropriate aggregation.
(5) Compile SQL, handling aggregation and built-in functions appropriately.

Disjunctions

The first step of compilation in the system 100 is eliminating disjunctions, or logical operations on two logical values that produce a value of FALSE if and only if both of its operands are FALSE. Conjunctions are logical operations on two logical values that produce a value of TRUE if and only if both of its operands are TRUE. Compiler 106 eliminates disjunctions by making each predicate defined as one or more rules, each having a body that is a conjunction of predicate calls.

SQL's disjunction functionality (e.g., the UNION function) as applied to predicates that retrieve data can be applied only to tables of data, while the described logic programming language allows disjunction to be applied to arbitrary expressions.

For example, compiler 106 eliminates disjunctions by first applying a distributive law (e.g., distributing each disjunction to the other operands) to convert the body of a rule that uses disjunction into a disjunctive normal form. A logical formula is considered to be in disjunctive normal form if it is the disjunction of one or more conjunctions of one or more literals. All logical formulas can be converted into an equivalent disjunctive normal form. Once the rule is in disjunctive normal form, the rule is replaced with multiple conjunctive rules (one rule per each disjunct).

An example of this disjunction elimination is shown in 202. For example, a rule with disjunction is:
PossibleLocationOfManager(location) :-
  Manager(manager),
  (PersonHomeLocation(manager, home)|PersonWorkLocation(manager, work));
The rule can first be converted to disjunctive normal form and then to two rules that do not include disjuncts:
PossibleLocationOfManager(location) :-
  Manager(manager),
  PersonHomeLocation(manager, home);
PossibleLocationOfManager(location) :-
  Manager(manager),
  PersonWorkLocation(manager, work);
These rules are then evaluated as SQL union. Here, it is assumed that the number of managers is small, thus avoiding performing a union of large tables PersonHomeLocation and PersonWorkLocation.

In another example, the following disjunction is semantically correct and can be written and compiled in the described logic programming language and compiler, but cannot be used in SQL:

DoubleOrTriple(y) :- N(x), (y==2*x|y==3*x);
This predicate creates a table with doubles and triples of numbers stored in N. The expression (y==2*x|y==3*x) does not involve tables, so it cannot be expressed in SQL using SQL's UNION function. DoubleOrTriple can be compiled using the same technique as the previous example.

Injectable and Concrete Predicates

Within the described system, a predicate is injectable if it is defined via a single non-aggregating rule. A predicate is concrete if it corresponds to an existing database table, or if compiler 106 can transform the predicate into a SELECT statement. Compiler 106 requires that any predicate must be either injectable or concrete.

Concrete predicates correspond to safe rules of the logic programming language, or rules that do not attempt to access one or more sets having infinite cardinality from a mathematical point of view and do not attempt to perform operations that do not converge to a minimal fix point. Injectable predicates can represent unsafe rules, or rules that represent sets of infinite cardinality or operations that do not converge to a minimal fix point. Although these rules can be considered unsafe due to the possibility of producing errors when executed, injectable predicates can be used to represent classical functions, and are useful in many contexts.

By supporting the use of unsafe predicates, the system 100 eliminates the need to precompute or structure finite tables of information. The system 100 allows the user to simply define a function without having to define each and every operation required to transform data into a form in which that function can be applied. While SQL limits a user to only those predicates and rules that operate over existing, defined tables or other data structures, the logic programming language allows users to operate over unknown datasets. For example, the logic programming language allows users to specify a predicate, such as the set of apples that are red, that acts as a filtered set of data even though the set of apples that are red could potentially refer to an infinite set that may never finish executing or represent an operation that may never finish executing.

Injecting a predicate P into a rule □ transforms the rule □, eliminating the call to P. Assuming that no variables used in the definition of P are used in the rule □. This can be done without loss of generality because the rule defining P can be transformed into an equivalent rule by renaming all of the variables with new, unique names. Injection is the substitution of the call to P within the rule □ with the body of P. The equality operator == can be used, for example, to tie variables of the rule defining P with the arguments of the call to P.

Example 13 shows a compilation of a predicate P. The code includes an injectable predicate F and a predicate P that uses injectable predicate F and an existing database table T. When a rule is being compiled all injectable predicates are injected. Other predicates are assumed to be concrete and compilation is called recursively for these predicates. The second code block illustrates the result of injecting F into the rule defining P.

Example 13

Original rules.
F(x, y) :- y==2*x;
P(a, b) :- T(a), F(a, b);
Rule for P after injection of F.
P(a, b):-
T(a), y==2*x,
x==a, y==b;

Rule after equality resolution.
P(a, 2*a) :- T(a);

Equality Resolution

Predicates of the logic programming language compile to SQL SELECT statements. Because there is no notion of a variable in SQL SELECT statement, compiler 106 eliminates variables that are not bound to input predicate fields by replacing them with expressions that operate over fields of the tables that are being queried. A variable is bound in a rule if it occurs as simple argument of a concrete predicate in the body of the rule. After injecting any injectable predicates, the compiler performs resolution of equalities. In some implementations, to resolve equalities compiler finds conjuncts of the form <variable>==<expression> or of the form <expression>==<variable>, where <variable> is not bound, and replaces all occurrences of the <variable> with the <expression>. This replacement continues until no such conjuncts are left.

Resolution of equalities can result in tautological equalities where the left hand side and the right hand side are exactly the same expressions. Compiler 106 removes any such equalities and remaining equality conjuncts are added to the WHERE clause of the resulting SELECT statement. Variables that occur in the concrete predicate calls are declared bound to the columns of the corresponding tables. If, after injections and equality resolutions, unbound variables remain, then compiler 106 throws an error informing the user of which variables could not be assigned a value.

Propositional Negation

The boolean value of the negation of a proposition can be expressed as an in-body aggregation. This is advantageous because negation is not supported in SQL, and therefore the compilation process described includes replacing negation with aggregation. For example, Assignment v==~P is equivalent to the conjunction of propositions v==IsNull (v_aux) and v_aux Sum=(1 :- P). Variable v_aux is equal to the number of combinations that make statement P true, and is equal to null if no such combinations exist. Therefore, the variable v will be equal to the negation of P.

Aggregation

There are two types of aggregation implemented within the system 100 and the described logic programming language, predicate-level aggregation and in-body aggregation. Predicate-level aggregation is compiled into a statement having a GROUP BY clause, while in-body aggregation is compiled into a sub-query. If a predicate is defined using predicate-level aggregation then it is not injectable. If a predicate is defined using in-body aggregation then it can be injectable.

Predicate-Level Aggregation

Within the described system 100, predicate-level aggregation is initiated by adding the keyword distinct to the head of the predicate, or by using aggregation syntax for the value of the functional predicate. For example, aggregated arguments use the syntax <argument>? F=E, where F is an aggregating function and E is an aggregated expression. An aggregating rule is compiled into SQL grouped aggregation with arguments which are not aggregated as keys.

In-Body Aggregation

An in-body aggregated value can be assigned to a variable in the body of the predicate using syntax v F=(E :- P), where v is a variable, F is an aggregating function, E is an aggregated expression, and P is a conjunctive proposition. The expression E and proposition P can refer to variables assigned in other conjuncts. An example of a program using in-body aggregation is shown above in Example 6. This aggregation expression is transformed into an auxiliary predicate Combine( ) F=E :- P; which is compiled into an SQL statement and is used as a value of the variable v. In this compilation, variables that are assigned in the outer scope of the aggregation are bound to the values that they were assigned. For example, in the program shown in Example 6, the variable items, which comes from the table Purchase, is then referred to in the aggregation. This variable is then bound to the field of Purchase when the aggregations are compiled.

Built-in Functions

The described logic programming language itself provides many built-in functions for operating on strings, numbers, dates, etc. Compiler 106 also includes a set of built-in functions and corresponding SQL expressions that these functions are compiled to. For example, a CamelCase function in the logic programming language can be compiled into a respective SNAKE CASE built-in function in SQL. In some implementations, functions that are not built-in can be defined and then compiled to a composite SQL expression. For example, the aggregate function Median(X) compiles to SQL expression APPROX QUANTILES(X, 2)[OFFSET(1)].

In some implementations, conjuncts that call built-in functions, including comparison operations like <=, >=, and != are compiled into SQL conjuncts in the WHERE clause. Equality operations == can be compiled into the WHERE clause or resolved as discussed about with respect to equality resolution.

The process 200 continues with stage C, in which computer-readable code is output from compiler 102. For example, the result of compilation of the logic programming code by compiler 106 is output.

The process 200 continues with stage D, in which the computer-readable code is provided to an engine that can run the computer-readable code and execute the commands indicated in the code. For example, compiler 106 can output computer-readable code to SQL code engine 110 to be executed.

The process 200 continues with stage E, in which result data from the engine is output. For example, the result of the computer-readable code executed can be output for display to a user or for further analysis.

In addition to advantages with respect to the readability and efficiency of the code offered by the system 100, additional advantages are provided by the structure and functionality of the logic programming language. For example, the introduction of annotations and functors allows users of the logic programming language to adapt their code and perform additional analysis. An example of the logic programming language and a query similar to queries that may be used in practice is shown in Example 11.

The program shown in Example 11 is an example program written in the logic programming language described that mines meteorological data to find weather stations of the highest and lowest temperature in each country. The program is written assuming the following input tables defined in the warehouse:

weather_data.weather2019: each row is a measurement for one day of 2019 year for one meteorological station.

weather_data.station: each row has a station_id with station information, including name and country.

For comparison, the program shown in Example 12 is an example program written in SQL that is equivalent to the program from Example 11.

Example 11

```
#Function mapping Fahrenheit to Centigrade.
FtoC (f)=(f−32)/1.8;
#Average temperature at each station.
StationAverage(country_name:, station_name:,
    temp? Avg=FtoC(temp)) distinct :-
    'weather_data.weather2019 '(station_id:, temp:),
    'weather_data.station'(station_id:, country_name:, station_name:);
#Hottest and coolest stations at each country, along with their temperature
#in Centigrade.
@OrderBy(CountryExtremes, "country_name");
CountryExtremes(
    country_name:,
    coolest_station? ArgMin=station_name→temp,
    hottest_station? ArgMax=station_name→temp,
    hottest_temp? Max=temp,
    coolest_temp? Min=temp) distinct :-
    StationAverage(country_name:, station_name:, temp:);
```

Example 12

```
#Function mapping Fahrenheit to Centigrade.
CREATE TEMP FUNCTION FtoC (f FLOAT64) AS ((f−32)/1.8);
#Average temperature at each station.
WITH StationAverage AS(
    SELECT
    country_name,
    station_name,
    AVG (FtoC(temp)) AS temp
    FROM
    weather_data.weather2019 AS weather INNER JOIN
    weather_data.station AS station USING (station_id)
    GROUP BY country_name, station_name
)
#Hottest and coolest stations at each country, along with their temperature
#in Centigrade.
SELECT
    country_name,
    ARRAY_AGG(station_name ORDER BY temp DESC)
    [OFFSET (0)] AS hottest_station,
    ARRAY_AGG(station_name ORDER BY temp)[OFFSET (0)] AS coolest_station,
    MAX (temp) AS hottest_temp,
    MIN (temp) AS coolest_temp
FROM
    StationAverage
GROUP BY country_name;
```

The structure of the data in this example is similar to the structure of real data sets used in practice. The logic programming language and system 100 provides a better fit for complex data science pipelines than SQL.

For example, if a user wanted to compute an average temperature over all stations in the country after the execution of the programs as shown in Examples 12 and 13, in the logic programming language, the predicate StationAverage is available as a building block for further analysis. Using the logic programming language, a user can compute this average by writing predicate CountryAverage as shown in Example 14.

Example 14

```
CountryAverage(
    country_name:,
    average_temp? Avg=temp) :-
    StationAverage(country_name:)
```

If, however, the user used SQL, then code for computing the average temperature in the country may be difficult to draft, require many more function calls, and be more prone to errors at runtime. For example, a user can copy and paste the expression WITH StationAverage AS ( . . . ) into a new query, but this causes code duplication, and any later changes in methodology for computing station average will need to be modified in two different places.

The user can also refactor the existing query, replacing the WITH expression with CREATE TABLE, if two users run the same query with slight modifications at the same time, one user's query execution can be corrupted, leading to inconsistent and/or inaccurate results. The WITH expression can be refactored into the CREATE TEMP TABLE expression, but even this solution can require further refactoring, or result in code duplication. For example, if the results are saved to a table to be re-used across multiple queries, the table would need to be renamed, the result would need to be added, and then all queries that already use the table may need to be updated. Additionally, if the table StationAverage needed to be reused in a different program in a different file, it is not possible to import the table from another file. Additionally, although some SQL dialects allow macros and table-valued functions that allow for re-using logic, the syntax may be confusing or difficult to use or read.

When users are dealing with a codebase of hundreds of interdependent queries and a collaborating teams, the absence of clarity of what the basic building blocks of the pipeline are and how to combine them causes a significant inefficiency, and the described logic programming language and compiler of the system eliminate or at least reduce these inefficiencies.

The use of variables the logic programming language reduces the need from code duplication. For example, as shown in Example 9, the value of total is used twice, once as a value in the returned table and once as a filter. In practice, values can be used multiple times for computing other columns and in sophisticated filtering expressions; with the logic programming language, the value of total can simply be used again. However, in SQL systems, a user would either need to repeat the expression or use a WITH statement. Variables in the logic programming language provide this functionality in a way that is easy to write and read.

Additionally, function notation in many situations makes the code more concise and clear with simpler syntax for defining regular functions than SQL's. The logic programming syntax of the logic programming language has the same relational declarative nature as SQL, allowing users to express complex data joins and transformations in a few lines of code. The logic programming language's mathematical syntax is similar to mainstream programming language and allows application of good engineering practices. Predicates are easy to compose, encouraging the modularization of code.

Therefore the described logic programming language can improve productivity and ease of coding when building complex pipelines whether in comparison to a relational language such as SQL or one of the imperative languages.

The described logic programming language compiles into SQL and provides a logic programming interface for relational databases or data warehouses, removing the need to move data into a different database architecture. The system offers users flexibility, allowing them to choose whether to continue using SQL or to use the described logic programming language. For example, users and teams for which simple queries suffice can choose to continue using SQL while specialists that develop complex pipelines can access the same data in the same storage using the described logic programming syntax.

Figure 3:
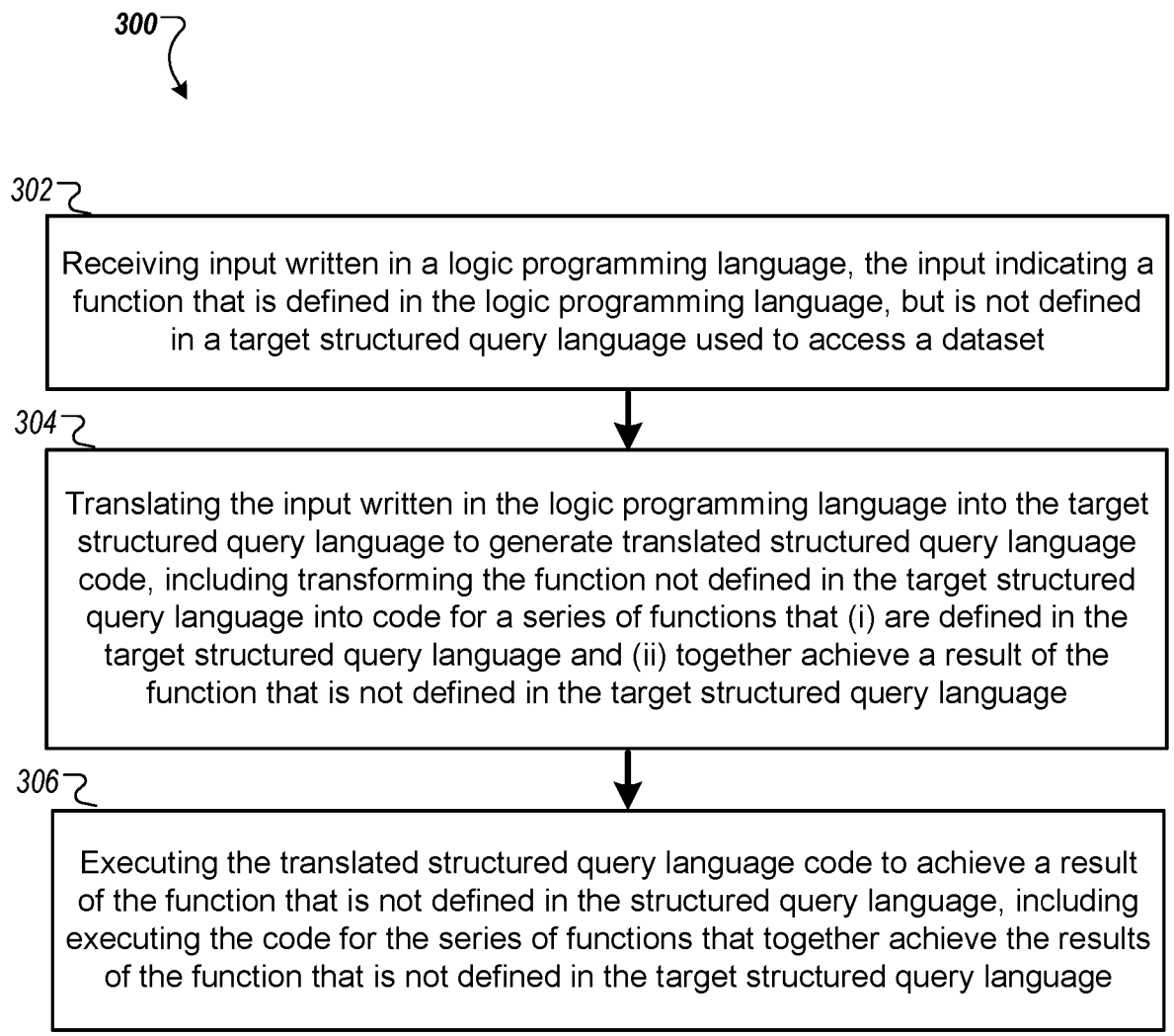
FIG. 3 is a flow diagram that illustrates an example process for translating code written in a logic programming language to code written in structured query language, compiled, and executed.

FIG. 3 is a flow diagram that illustrates an example process 300 for translating logic programming language code into computer-readable code and compiling and executing the. Operations of the process 300 can be implemented, for example, by processor 102, compiler 106, and SQL code engine 110. Operations of the process 300 can also be implemented as instructions stored on one or more computer readable media which may be non-transitory, and execution of the instructions by one or more data processing apparatus can cause the one or more data processing apparatus to perform the operations of the process 300.

Process 300 begins with receiving, by one or more processors, input written in a logic programming language, the input indicating a function that is defined in the logic programming language, but is not defined in a target structured query language used to access a dataset (302). For example, processor 102, which can control and direct the operations of compiler 106, can receive input written in the described logic programming language that queries and/or manipulates operations over a set of data in a storage medium, such as a memory of a computer. The input can include a function that is defined in the logic programming language, but is not defined or supported, in SQL. For example, as discussed above, a single function defined in the logic programming language may require many SQL function calls to achieve the same result.

Process 300 continues with translating, by the one or more processors, the input written in the logic programming language into the target structured query language to generate translated structured query language code, including transforming the function not defined in the target structured query language into code for a series of functions that (i) are defined in the target structured query language and (ii) together achieve a result of the function that is not defined in the target structured query language (304). For example, compiler 106 can translate the input written in the logic programming language into SQL to generate computer-readable code. The logic programming code can include code that indicates functions that are not defined in SQL. For example, functions in SQL are limited, and the logic programming language 104 can indicate a function that is not defined in SQL.

In some implementations, translating the input written in the logic programming language includes detecting a functor within a function written in the logic programming language, wherein the functor comprises code that maps a first predicate written in the logic programming language to a second predicate written in the logic programming language that comprises one or more operations, and replacing, based on the functor code, the first predicate within the function with the one or more operations of the second predicate. For example, the compiler 106 can detect a functor written in the logic programming language as described above with respect to FIGS. 1-2. The functor can map a predicate in the logic programming language to a second predicate in the logic programming language and compiler 106 can replace the functor code with the second predicate.

In some implementations, the function that is not supported by the structured query language includes one or more unsafe predicates that are able to compromise a robustness of a server in the structured query language by (1) attempting to access one or more sets having infinite cardinality or (2) performing an operation that does not converge to a minimal fix point. For example, the function that is not supported in SQL can include unsafe predicates as described above with respect to FIGS. 1-2.

In some implementations, the compiler can detect an annotation that includes a reserved predicate that defines a relationship between a variable or function and a defined set of data existing within a target database specified within the input written in the logic programming language. For example, compiler 106 can detect an annotation including a reserved predicate as described above with respect to FIGS. 1-2.

In some implementations, transforming the function not defined in the target structured query language into code for a series of functions includes, for each function of the series of functions, applying the distributive rule to the operations of the function to transform the function to a disjunctive normal form, replacing each disjunctive in the disjunctive normal form of the function with a conjunctive to generate a conjunctive form of the function, replacing each call to a predicate with the predicate itself, wherein the predicate represents one or more sets of infinite cardinality, replacing each variable that is not bound to input predicate fields with an expression that operates over fields of specific tables being queried by the function, and replacing each negation of a proposition with an in-body aggregation expression.

For example, transforming the function not defined in SQL into code for a series of functions that are defined in SQL includes, for each function, eliminating disjunctions by the compiler 106 by reducing all rules to conjunctive form by applying the distributive rule to the operations of the function to transform the function into its disjunctive normal form. It also includes replacing each disjunctive with a conjunctive to generate a conjunctive form of the function, and then injecting unsafe predicates, by replacing each call to a predicate with the predicate itself.

In some implementations, replacing each call to a predicate with the predicate itself includes determining that the predicate comprises one or more aggregated values and, for each aggregate value of the one or more aggregated values, determining that the aggregated value is assigned to a variable in the body of the predicate. For example, compiler 106 can determine that the aggregated values are bound variables.

Transforming the function further comprises resolving equalities, leaving only those variables that are bound to input predicate fields. It also includes replacing negation of propositions with appropriate aggregation expressions.

Translating the input written in the logic programming language can include determining that a function exists in a list of functions, wherein each entry maps a particular function in the logic programming language to one or more corresponding functions defined in the target structured query language and compiling, based on an entry in the list of functions, the function in the logic programming language into a corresponding function defined in the target structured query language. For example, translating the input written in the logic programming can directly translate some functions from logic programming language into SQL. More specifically, a single function of the logic programming language may be translated into multiple SQL functions that are required to be performed in order to achieve the result of the single function of the logic programming language.

Process 300 continues with executing, by the one or more processors, the translated structured query language code to achieve a result of the function that is not defined in the structured query language, including executing the code for the series of functions that together achieve the results of the function that is not defined in the target structured query language (306). For example, SQL code engine 110 can execute the computer-readable code from the compiler 106 to achieve the results of the function as written in the logic programming language using SQL on a set of data.

Figure 4:
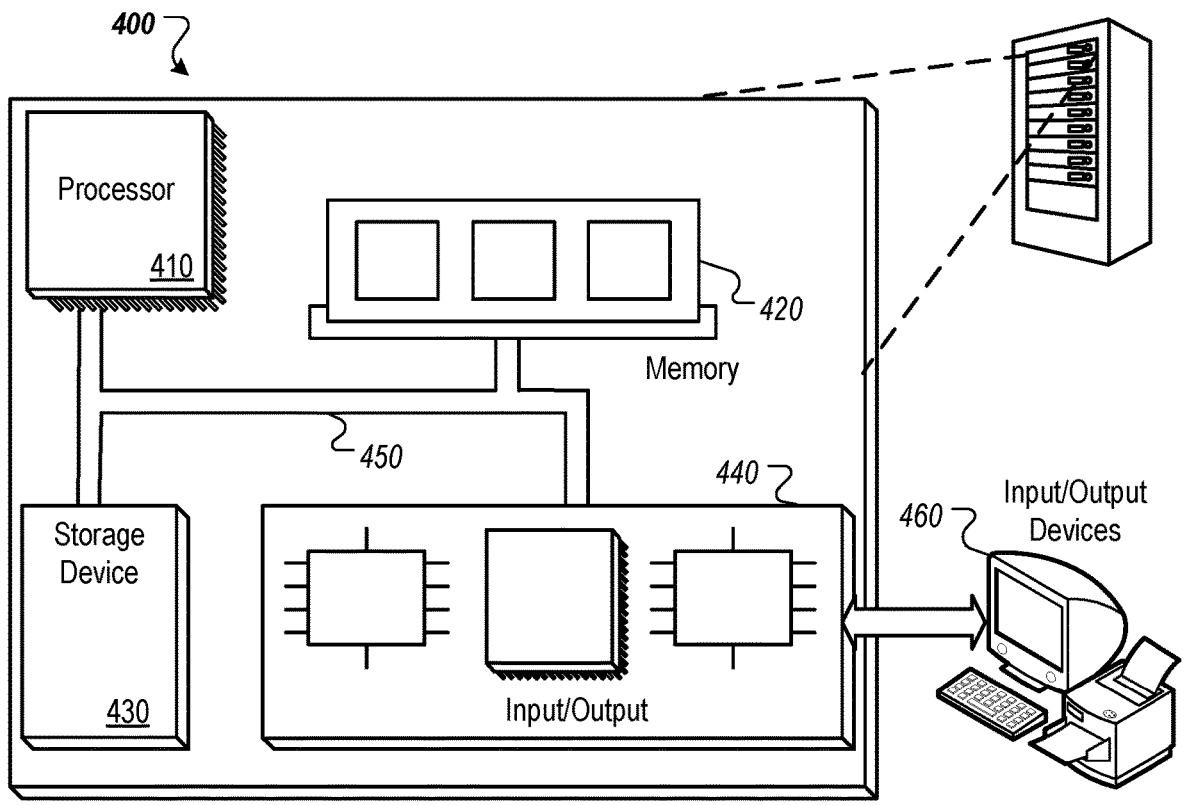
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for translating logic programming language code into structured query language code comprising:
receiving, by one or more processors, input written in a logic programming language, the input indicating a first function that is defined in the logic programming language, but is not defined in a target structured query language used to access a dataset;
translating, by the one or more processors, the input written in the logic programming language into the target structured query language to generate translated structured query language code, including transforming the first function into code for a series of functions that are defined in the target structured query language, wherein the series of functions achieves a result of the first function, wherein translating the input written in the logic programming language into the target structured query language comprises:
detecting a functor within a second function written in the logic programming language, wherein the functor comprises code that maps a first predicate written in the logic programming language to a second predicate written in the logic programming language, wherein the second predicate comprises one or more operations; and
replacing, based on the code of the functor, the first predicate within the second function with the one or more operations of the second predicate; and
executing, by the one or more processors, the translated structured query language code to achieve a result of the first function, including executing the code for the series of functions.

2. The method of claim 1, further comprising detecting an annotation that comprises a reserved predicate that defines a relationship between a variable or function and a defined set of data existing within a target database specified within the input written in the logic programming language.

3. The method of claim 1, wherein the first function includes one or more predicates that are able to compromise a robustness of a server in the target structured query language by (1) attempting to access one or more sets having infinite cardinality or (2) performing an operation that does not converge to a minimal fix point.

4. The method of claim 1, wherein translating the input written in the logic programming language into the target structured query language to generate the translated structured query language code comprises:
determining that a given function exists in a list of functions, wherein each entry in the list of functions maps a particular function in the logic programming language to one or more corresponding functions defined in the target structured query language; and
compiling, based on a particular entry in the list of functions, the given function into a corresponding function defined in the target structured query language.

5. The method of claim 1, wherein transforming the first function into the code for the series of functions comprises:
for each function of the series of functions:
applying a distributive rule to operations of the function to transform the function to a disjunctive normal form;
replacing each disjunctive in the disjunctive normal form of the function with a conjunctive to generate a conjunctive form of the function;
replacing each call to a predicate with the predicate itself, wherein the predicate represents one or more sets of infinite cardinality;
replacing each variable that is not bound to input predicate fields with an expression that operates over fields of specific tables being queried by the function; and
replacing each negation of a proposition with an in-body aggregation expression.

6. The method of claim 5, wherein replacing each call to a predicate with the predicate itself comprises:
determining that the predicate comprises one or more aggregated values; and
for each aggregate value of the one or more aggregated values, determining that the aggregated value is assigned to a variable in a body of the predicate.

7. A system comprising:
one or more processors; and
one or more memory elements including instructions that, when executed by the one or more processors, cause the one or more processors to perform operations comprising:
receiving, by the one or more processors, input written in a logic programming language, the input indicating a first function that is defined in the logic programming language, but is not defined in a target structured query language used to access a dataset;

translating, by the one or more processors, the input written in the logic programming language into the target structured query language to generate translated structured query language code, including transforming the first function into code for a series of functions that are defined in the target structured query language, wherein the series of functions achieve a result of the first function, wherein translating the input written in the logic programming language into the target structured query language comprises:

detecting a functor within a second function written in the logic programming language, wherein the functor comprises code that maps a first predicate written in the logic programming language to a second predicate written in the logic programming language, wherein the second predicate comprises one or more operations; and replacing, based on the code of the functor, the first predicate within the second function with the one or more operations of the second predicate; and executing, by the one or more processors, the translated structured query language code to achieve a result of the first function, including executing the code for the series of functions.

8. The system of claim 7, the operations further comprising detecting an annotation that comprises a reserved predicate that defines a relationship between a variable or function and a defined set of data existing within a target database specified within the input written in the logic programming language.

9. The system of claim 7, wherein the first function includes one or more predicates that are able to compromise a robustness of a server in the target structured query language by (1) attempting to access one or more sets having infinite cardinality or (2) performing an operation that does not converge to a minimal fix point.

10. The system of claim 7, wherein translating the input written in the logic programming language into the target structured query language to generate the translated structured query language code comprises:

determining that a given function exists in a list of functions, wherein each entry in the list of functions maps a particular function in the logic programming language to one or more corresponding functions defined in the target structured query language; and compiling, based on a particular entry in the list of functions, the given function into a corresponding function defined in the target structured query language.

11. The system of claim 7, wherein transforming the first function into the code for the series of functions comprises:

for each function of the series of functions:

applying a distributive rule to operations of the function to transform the function to a disjunctive normal form;

replacing each disjunctive in the disjunctive normal form of the function with a conjunctive to generate a conjunctive form of the function;

replacing each call to a predicate with the predicate itself, wherein the predicate represents one or more sets of infinite cardinality;

replacing each variable that is not bound to input predicate fields with an expression that operates over fields of specific tables being queried by the function; and replacing each negation of a proposition with an in-body aggregation expression.

12. The system of claim 11, wherein replacing each call to a predicate with the predicate itself comprises:

determining that the predicate comprises one or more aggregated values; and for each aggregate value of the one or more aggregated values, determining that the aggregated value is assigned to a variable in a body of the predicate.

13. A non-transitory computer storage medium encoded with instructions that when executed by a distributed computing system cause the distributed computing system to perform operations comprising:

receiving, by one or more processors, input written in a logic programming language, the input indicating a first function that is defined in the logic programming language, but is not defined in a target structured query language used to access a dataset;

translating, by the one or more processors, the input written in the logic programming language into the target structured query language to generate translated structured query language code, including transforming the first function into code for a series of functions that are defined in the target structured query language, wherein the series of functions achieves a result of the first function, wherein translating the input written in the logic programming language into the target structured query language comprises:

detecting a functor within a second function written in the logic programming language, wherein the functor comprises code that maps a first predicate written in the logic programming language to a second predicate written in the logic programming language, wherein the second predicate comprises one or more operations; and replacing, based on the code of the functor, the first predicate within the second function with the one or more operations of the second predicate; and executing, by the one or more processors, the translated structured query language code to achieve a result of the first function, including executing the code for the series of functions.

14. The non-transitory computer storage medium of claim 13, the operations further comprising detecting an annotation that comprises a reserved predicate that defines a relationship between a variable or function and a defined set of data existing within a target database specified within the input written in the logic programming language.

15. The non-transitory computer storage medium of claim 13, wherein the first function includes one or more predicates that are able to compromise a robustness of a server in the target structured query language by (1) attempting to access one or more sets having infinite cardinality or (2) performing an operation that does not converge to a minimal fix point.

16. The non-transitory computer storage medium of claim 13, wherein translating the input written in the logic programming language into the target structured query language to generate the translated structured query language code comprises:

determining that a given function exists in a list of functions, wherein each entry in the list of functions maps a particular function in the logic programming language to one or more corresponding functions defined in the target structured query language; and compiling, based on a particular entry in the list of functions, the given function into a corresponding function defined in the target structured query language.

17. The non-transitory computer storage medium of claim 13, wherein transforming the first function into the code for the series of functions comprises:

for each function of the series of functions:
  applying a distributive rule to operations of the function to transform the function to a disjunctive normal form;
  replacing each disjunctive in the disjunctive normal form of the function with a conjunctive to generate a conjunctive form of the function;
  replacing each call to a predicate with the predicate itself, wherein the predicate represents one or more sets of infinite cardinality;
  replacing each variable that is not bound to input predicate fields with an expression that operates over fields of specific tables being queried by the function; and
  replacing each negation of a proposition with an in-body aggregation expression.

* * * * *